(12) United States Patent
Butala et al.

(10) Patent No.: US 9,332,391 B2
(45) Date of Patent: May 3, 2016

(54) METHOD AND APPARATUS FOR LOCATION BASED SERVICES

(75) Inventors: Amit Butala, Sunnyvale, CA (US); Sudhakar Peddibhotla, Redwood City, CA (US); Bill Evans, Menlo Park, CA (US); Murari Srinivasan, Palo Alto, CA (US)

(73) Assignee: SpiderCloud Wireless, Inc., Milpitas, CA (US)

( * ) Notice: Subject to any disclaimer, the term of this patent is extended or adjusted under 35 U.S.C. 154(b) by 869 days.

(21) Appl. No.: 13/470,099

(22) Filed: May 11, 2012

(65) Prior Publication Data

US 2013/0303188 A1    Nov. 14, 2013

(51) Int. Cl.
*H04W 4/02* (2009.01)
(52) U.S. Cl.
CPC ........................ *H04W 4/025* (2013.01)
(58) Field of Classification Search
CPC ..................................................... H04W 4/02
See application file for complete search history.

(56) References Cited

U.S. PATENT DOCUMENTS 8,213,957 B2 * 7/2012 Bull et al. ................... 455/456.1
8,478,290 B2 * 7/2013 Yoeli ........................... 455/456.1

OTHER PUBLICATIONS

3rd Generation Partnership Project (3GPP); Technical Specification Group (TSG) Radio Access Network (RAN); Working Group 1 (WG1); Physical Layer—Measurements (FDD), TS 25.215.

* cited by examiner

*Primary Examiner* — Michael T Vu
(74) *Attorney, Agent, or Firm* — TechLaw LLP

(57) ABSTRACT

Systems and methods for providing location estimates of user equipment to be used in location based services are provided. Data collected from users in a local radio access network (RAN), such as an Enterprise RAN (E-RAN), as well as configuration information of the local RAN/E-RAN is siphoned from the system and utilized in conjunction with a location engine to provide a high accuracy location estimate for users in an indoor environment. The siphoned data is provided in a real-time location stream to the location engine.

40 Claims, 4 Drawing Sheets

METHOD AND APPARATUS FOR LOCATION BASED SERVICES

TECHNICAL FIELD

The present invention relates to communication networks, and more particularly, to systems and methods for providing and improving location accuracy of user equipment (UE) in an underlay local area Radio Access Network (RAN) for location based services.

BACKGROUND

Cellular networks have traditionally been deployed in a homogenous manner. For example, a typical cellular network may comprise a plurality of macrocells that are fairly uniform in the coverage areas they support. In the case of $3^{rd}$ Generation Partnership Project (3GPP) Universal Mobile Telecommunications System (UMTS) networks, each of these macrocells is connected to a Radio Network Controller (RNC). The RNC generally effectuates radio resource management, as well as some mobility management functionality, such as facilitating handover, maintaining device state, and supporting layer 2 data-plane protocols.

There are some exceptions to the uniform deployment paradigm described above, such as picocell and femtocell networks that are deployed in conjunction with an overarching macrocellular network. That is, picocells and femtocells, which may be considered small cellular base stations or access points, connect to a service provider's macrocellular network via broadband connections, allowing the macrocellular network to be extended either for capacity augmentation or for extending the coverage (e.g., indoors). These picocells and femtocells may be deployed in the same frequency channel as the macrocellular network, in which case they are referred to as co-channel deployments, or in a different frequency channel, in which case they are referred to as dedicated channel deployments.

For example, in-building Distributed Antenna Systems (DASs), powered by picocells, are deployed sporadically within the shadow of the macrocellular network. These picocells are typically manually provisioned to connect to the same RNC that is serving the nearby macrocells, thus facilitating mobility in and out of the coverage area of the picocell. In recent years, there has been a rapid growth of consumer femtocells, which are typically standalone entities serving a limited area. Each of these consumer femtocells is typically connected to a femtocell gateway that interfaces the femtocells with the core network of the cellular service provider.

Location based services provide an opportunity for businesses/service providers to customize and deliver services to users based on a physical location of the user. Such services have conventionally relied on access to data that is either not always known with precision, as is the case with Global Positioning Systems (GPS) for indoor environments, or requires specialized hardware, as is the case with near field communications (NFC). Imprecise data results in inadequate location accuracy for these location based services. Deployment of in-building systems, such as the SpiderCloud® Wireless, Inc. Enterprise RAN (E-RAN), changes these considerations.

With regard to local RANs, such as an E-RAN, a primary function of the local RAN is to provide seamless voice and high bandwidth data access to users that have authorized access, and are connected to the local RAN. As a part of this primary function, and in order to continuously optimize the quality of the connection to the user, the local RAN collects a large volume of data from each user connected to the local RAN. This data is a part of the wireless protocols used between the local RAN and the user for access to the system.

While this data collected from the users is not internally processed for a location estimate of the user, it is a function of the location of the user in the system. Thus, it would be advantageous to exploit the collected data by siphoning the data from, e.g., a local RAN, in a time-sensitive fashion. Doing so would enable development and integration with a location engine, such as a third-party location engine, to provide a high accuracy location estimate for users in an indoor environment.

SUMMARY

Various aspects of examples of the invention are set out in the claims.

According to a first aspect of the present invention, a method comprises receiving a measurement report of one or more radio nodes within a local radio access network from a user equipment. The method further comprises, reading the measurement report and configuration information of the local radio access network to extract data relevant to the user equipment and to a location based service. The method further still comprises generating one of a location stream based on the extracted data to be utilized with the location based service or a location estimate of the user equipment based on the extracted data.

According to a second aspect of the present invention, an apparatus comprises a processor; and a memory including computer program code, the memory and the computer program code configured to, with the at least one processor, cause the apparatus to perform at least the following: receiving a measurement report of one or more radio nodes within a local radio access network from a user equipment; reading the measurement report and configuration information of the local radio access network to extract data relevant to the user equipment and to a location based service; and generating one of a location stream based on the extracted data to be utilized with the location based service or a location estimate of the user equipment based on the extracted data.

According to a third aspect of the present invention, a computer program product is embodied on a computer-readable non-transitory medium and comprises computer code for receiving a measurement report of one or more radio nodes within a local radio access network from a user equipment; computer code for reading the measurement report and configuration information of the local radio access network to extract data relevant to the user equipment and to a location based service; and computer code for generating one of a location stream based on the extracted data to be utilized with the location based service or a location estimate of the user equipment based on the extracted data.

According to a fourth aspect of the present invention, a system comprises a location engine configured to provide a location estimate of a user equipment to a location based service application. The system further comprises a local radio access network comprising at least one radio node serving the user equipment. The local radio access network comprises a configuration element configured to receive a request for the location estimate of the user equipment from the location engine, identify the user equipment for which the location estimate is to be provided, and maintain configuration information of the local radio access network. The local radio access network further comprises a user equipment manager element configured to manage a connection state of the user equipment, read the measurement report and configuration information of the local radio access network to extract data relevant to the user equipment and to the location based service, and one of generate a location stream based on the extracted data to be utilized in determining the location estimate of the user equipment and provided by a push element or directly generate the location estimate of the user equipment based on the extracted data.

According to a fifth aspect of the present invention, a method comprises requesting a location estimate for a user equipment served by a local radio access network. The method further comprises one of either: receiving the requested location stream in substantially real-time, and estimating the location of the user equipment based on the received location stream, where the received location stream is in turn, based upon a measurement report conducted by the user equipment of at least one radio node of the local radio access network and configuration information relevant to the local radio access network; or receiving the location estimate for the user equipment, the location estimate being based upon the measurement report conducted by the user equipment of the at least one radio node of the local radio access network and the configuration information relevant to the local radio access network.

According to a sixth aspect of the present invention, an apparatus comprises a processor; and a memory including computer program code, the memory and the computer program code configured to, with the at least one processor, cause the apparatus to perform at least the following: requesting a location estimate for a user equipment served by a local radio access network, and one of either: receiving the requested location stream in substantially real-time, and estimating the location of the user equipment based on the received location stream, where the received location stream is in turn, based upon a measurement report conducted by the user equipment of at least one radio node of the local radio access network and configuration information relevant to the local radio access network; or receiving the location estimate for the user equipment, the location estimate being based upon the measurement report conducted by the user equipment of the at least one radio node of the local radio access network and the configuration information relevant to the local radio access network.

According to a seventh aspect of the present invention, a computer program product is embodied on a computer-readable non-transitory medium and comprises computer code for requesting a location estimate for a user equipment served by a local radio access network, and one of either: computer code for receiving the requested location stream in substantially real-time, and estimating the location of the user equipment based on the received location stream, where the received location stream is in turn, based upon a measurement report conducted by the user equipment of at least one radio node of the local radio access network and configuration information relevant to the local radio access network; or computer code for receiving the location estimate for the user equipment, the location estimate being based upon the measurement report conducted by the user equipment of the at least one radio node of the local radio access network and the configuration information relevant to the local radio access network.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

As alluded to above, data (e.g., measured data) that is normally collected during the operation of a local RAN, such as an E-RAN, may be exploited to provide a location estimate of users/UE. In particular, and in accordance with various embodiments, a "location stream" may be provided. Such a location stream may include, e.g., data configured on the local RAN (i.e., the local RAN's knowledge of itself), and data collected from users/UEs connected to the local RAN as part of the wireless protocol(s) utilized between the local RAN and the user/UE (i.e., the local RAN's knowledge of the UE) that may be used to determine the spatial location of the user in the local RAN. The location stream may be continuously generated in near-realtime based on knowledge at the local RAN of updates to the user's location. It should be noted that throughout this specification, the term "E-RAN" or "local RAN" may be used to refer to any local area network that is deployed in conjunction with a macrocellular network, either on the same frequency, or deployed in a distinct frequency, for example, such as a cluster or ad-hoc network of femtocells. It should be further noted that while the various embodiments, concepts, examples, and syntax provided herein are discussed in the context of the UMTS standard, other embodiments may be implemented for use with any other type of wireless protocol/platform/system.

Figure 1:
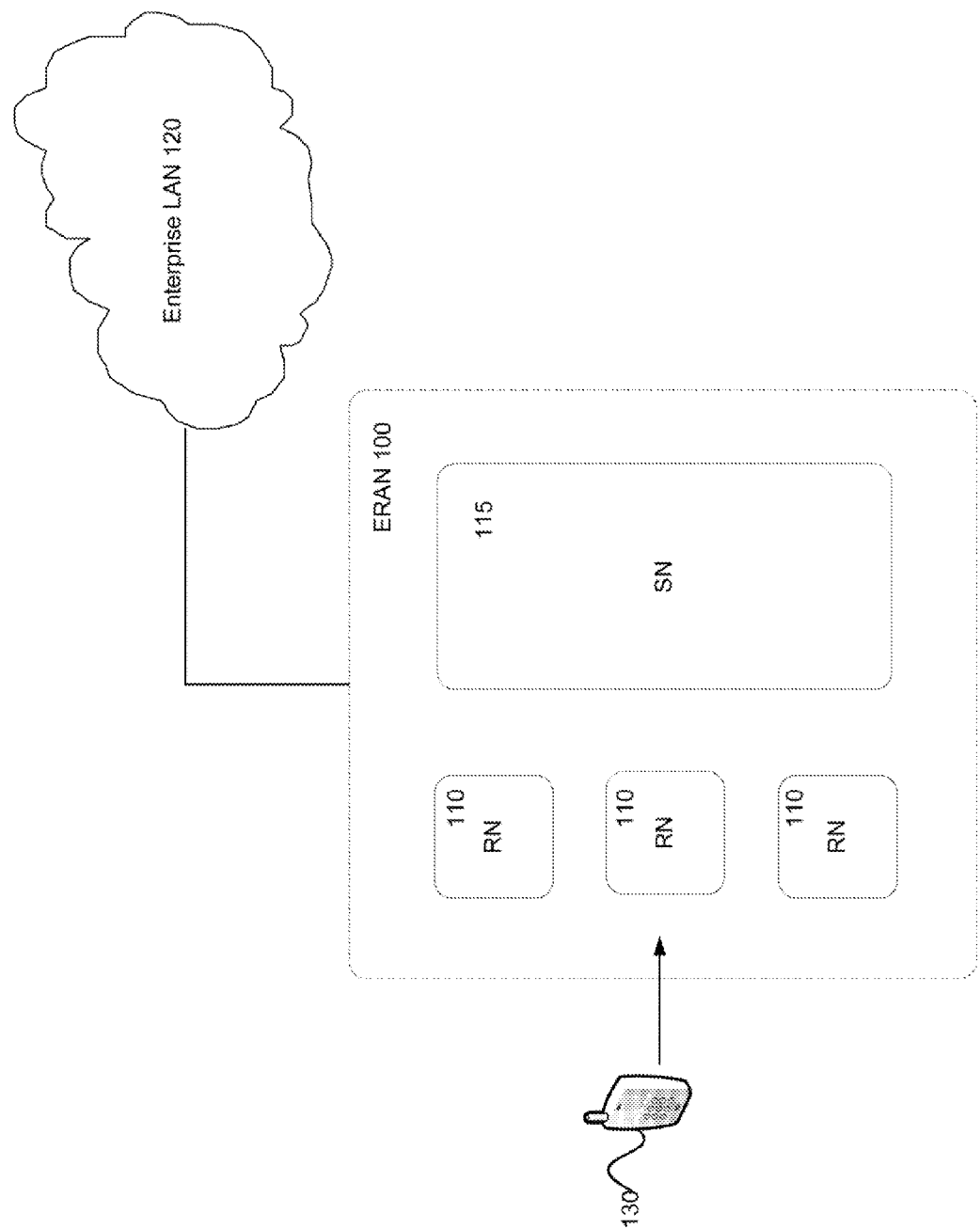
FIG. 1 is an exemplary network in which various embodiments of the present invention may be implemented.

FIG. 1 is a schematic illustration of a network in which various embodiments of the present invention may be implemented. A local RAN 100 may comprise at least two types of nodes, a radio node (RN) and a services node (SN). FIG. 1 illustrates that the local RAN 100 includes 3 RNs 110 and an SN 115. More or less nodes may be utilized in accordance with the required needs of the network. The SN 115 is an "aggregation node" that may be implemented as an enterprise premise-based controller element that coordinates a group of RNs, e.g., RNs 110 of FIG. 1. The SN 115 may be, e.g., a UMTS Radio Network/Node Controller (RNC), and policy-based Internet Protocol (IP) edge router combined into one platform, or alternatively, a cloud-based aggregation node. In other words, the SN is the central control point for the RNs 110, and acts a gateway implemented in the enterprise LAN 120 that provides traffic aggregation and session management for any mobile sessions coming through the RNs 110, such as that from UE 130. In the case of a cluster or ad-hoc network of femtocells, the functionality on the SN is distributed across all the femtocells in the network.

Figure 2:
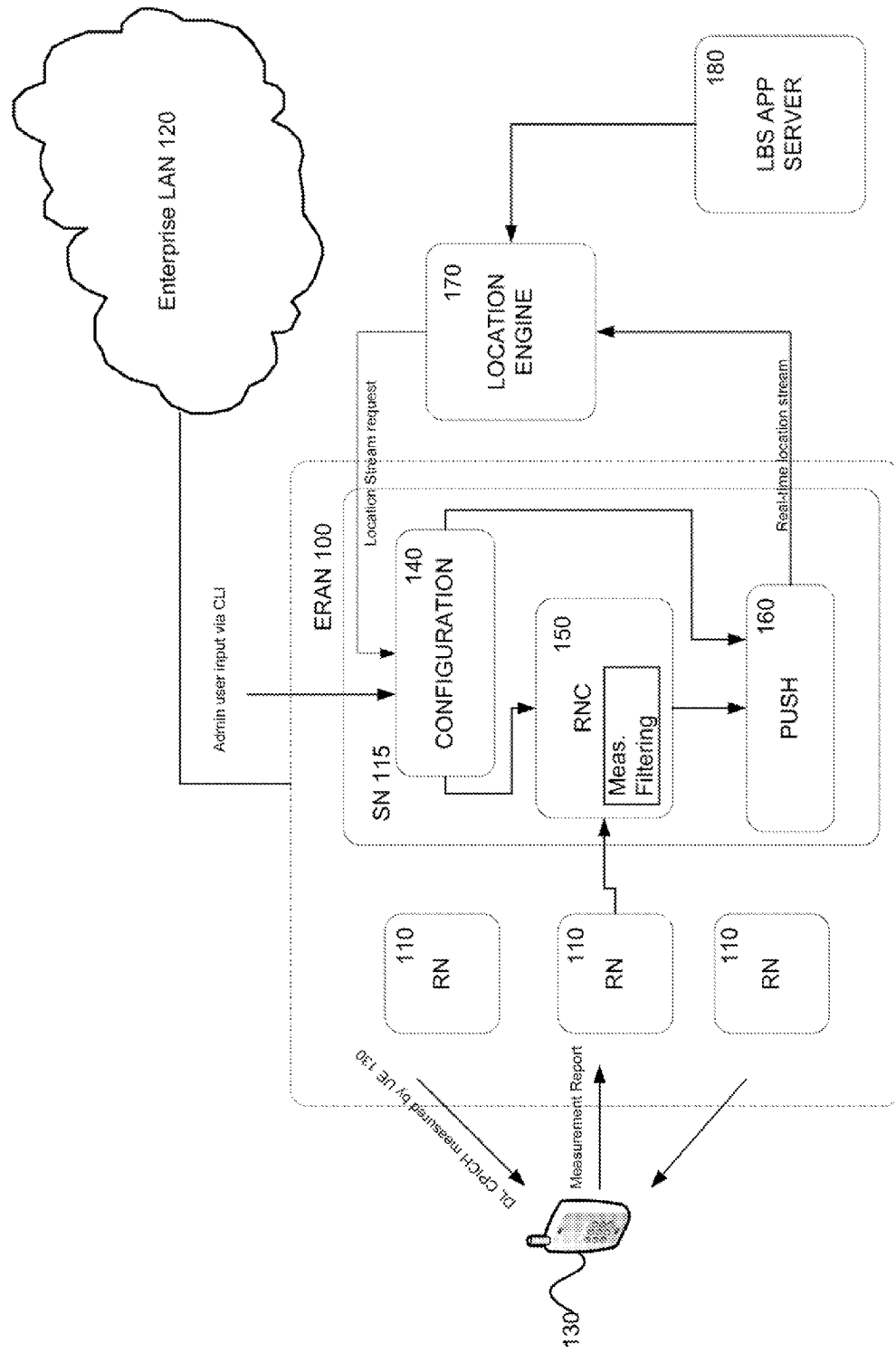
FIG. 2 is an exemplary schematic representation of the network of FIG. 1 with the addition of functional elements utilized in accordance with various embodiments to effectuate providing a location stream.

FIG. 2 illustrates an exemplary schematic representation of the network of FIG. 1 with the addition of functional components/modules/elements utilized in accordance with various embodiments to effectuate providing a location stream. Similar to FIG. 1, FIG. 2 illustrates the UE 130 as being connected to the local RAN 100 via one of the RNs 110, where the local RAN 100 is implemented on the Enterprise LAN 120. In accordance with various embodiments, a location stream can be made available after the UE 130 connects to the local RAN 100. The positioning accuracy/resolution and update rate of the location of the UE 130 is dependent, at least in part, on the connection state of the UE 130 relative to the local RAN 100. It may be assumed that in certain embodiments, a third party location engine 170 (as will be discussed in greater detail) influences the connection state of the UE 130.

As previously described, the RNs 110 are part of the local RAN, and may be, e.g., a UMTS nodeB (NB) or a Long Term Evolution (LTE) evolvedNB (eNB) or WiMax. It should be noted that in the context of consumer femtocells, each of the femtocells may be likened to an RN. The RNs 110 are discoverable by a UE, such as UE 130 that is connected to the local RAN 100, and are, in the case of UMTS, reported back to the local RAN 100 via a UE information reporting message. This UE information reporting message may be, for example, a 3GPP-compliant "measurement report" message. Equivalent messages could be used for other technologies, such as LTE or WiMax. For example, a measurement control message may be sent from the SN 115 to the UE 130 instructing it to perform measurements. The UE 130 then reports back to the SN 115 with the measurements in the measurement report message. Measurement control for event-based measurement reporting is standard, e.g., for soft handoff purposes, but can also be used for periodic reporting. As illustrated in FIG. 2, the UE 130 may discover one of the RNs 110 and thereafter measure a downlink (DL) common pilot channel (CPICH), and informs, via a measurement report, the presence of this cell, either on the same frequency in the case of a co-channel deployment, or on a separate frequency in the case of an inter-frequency deployment.

A configuration module/component 140 is also included in the local RAN 100. The configuration component 140 may be utilized to perform various functions including, but not limited to the following: augmenting the system's knowledge of itself (e.g., the coordinates of an RN); identifying the users for whom a location stream is requested; configuring a syslog reporting engine; and configuring filtering and granularity for data that is transmitted by the local RAN 100 over the location stream provided in accordance with various embodiments. Such configuration may be effectuated by, e.g., an administrator user via a command line interface (CLI).

Radio Network/Node Controller (RNC) 150 is an element within the SN that is responsible for controlling the RNs by carrying out, e.g., radio resource management, mobility management, etc. In the context of location streams, the RNC 150 refers to a process on the local RAN 100 that constitutes the intelligence found in the location stream. This process is responsible for at least the following aspects: managing a connection state of the UE 130; reading the measurement report messages from the UE 130 and system configuration (from the configuration component 140) to extract relevant information for a user of interest; and processing, filtering, and compressing user data into the location stream.

A push element 160 is configured to push the location stream to the relevant network element. In accordance with one embodiment, the push element 160 may be, e.g., a syslog push element that is a standards-defined syslog client that receives syslog events from processes on the local RAN 100. The location stream is made up of at least "location reports" and "location updates." A location update refers to a single message, such as a syslog message, with the positional information of the UE 130 in relation to one cell (served, e.g., by one of the RNs 110) in the local RAN 100. A location report includes one or more location update messages along with the positional information of the UE 130 relative to multiple cells in the local RAN. It should be noted that an update rate, payload size, reporting resolution for the location updates can be fine tuned in accordance with, e.g., bandwidth considerations. In other embodiments, instead of syslog, alternate mechanisms could be used for communicating the location stream to the relevant network element.

The location stream may be always on, or enabled only for a set of predefined users or enabled only upon a request from the relevant network element, or may have a low resolution always on component and switch to a high resolution based on the request. The degree of reporting resolution may be inferred from an attribute in the request.

Further with regard to syslog events, the syslog payload is defined to have a fixed number of attribute-value pair, while a measurement report from the UE 130 may refer to multiple cells. To resolve this inconsistency, in accordance with various embodiments, one syslog message is generated per user per cell. If multiple cells are present in a single measurement report from the UE 130, multiple syslog messages are generated, although all of these syslog messages will carry the same sequence identifier. The syslog message in accordance with various embodiments has the following syntax: <priority-code>version timestamp hostname process processed MSGID [STRUCTURED-DATA] message-text. These attributes are defined in Table 1.

TABLE 1

| | |
|---|---|
| priority-code | Number indicating message's facility and severity. |
| version | Syslog protocol version. This is always 1. |
| timestamp | Time at which the message was created for delivery. |
| hostname | Hostname of ServicesNode. |
| process | Name of ServicesNode process that generated the message. |
| processID | Process ID of the ServicesNode process that generated the message. |
| MSGID | A unique identifier of the type of event generated. |
| STRUCTURED-DATA | This is the location stream payload as described below in Table 2 and encoded to the specifications of Syslog STRUCTURED-DATA as defined in Internet Engineering Task Force (IETF) Standard RFC-5424. |
| message-text | Free form text. |

A third party location engine 170 refers to a third party application/module that may be hosted anywhere on the network and configured to receive and process the location stream in order to generate a location estimate for the UE 130 in near real-time. A request for a location stream may also be generated, at the third party location engine 170 and sent to the configuration component 140. The request may determine the precision and granularity required, as well as the duration for which the reporting should continue. Alternatively, there may not be any requests and the local RAN will generate a location stream based on user profiles configured a priori on the system. It should be noted that the third party location engine 170 may be subsumed into the SN 115, in which case, the SN 115 would "directly" generate a location estimate of the UE 130 instead of providing a location stream to be used in generating the location estimate. A location based services application server 180 may also be included in the network for hosting a location based service application that accesses/utilizes the aforementioned location estimate for the UE 130.

In order for a local RAN to provide a location stream associated with a UE, the UE could be a predefined UE. In accordance with various embodiments, the UE may be identified by the International Mobile Subscriber Identity (IMSI) of the UE, where preferably, the IMSI of the UE is configured on the local RAN prior to the UE connecting to the local RAN. Additionally, the number of predefined UEs that are simultaneously configured to have a location stream generated/sent on their behalf may be limited or restricted based on a configurable/preset value. Further still, a location stream of a UE is identified with the IMSI of the UE, although it is possible to also include the IP address of the UE. That is, any communication channel between a location based service application server and a UE is dependent upon the UEs IMSI during establishment of the channel.

A marker may be sent in the location stream to indicate the end of a location report. The marker may be implicit, for example, by sending out the serving cell information as the last message in the location report. In this case, a tag "CellsServing=true" is overloaded to indicate the end of the location report as well. All of the messages in the same location report have the same report id, where the report id can be a linearly increasing value that starts at, e.g., "1" for each new UE session of interest.

Moreover, the location update could include the following structured data attributes indicated in Table 2. Additional parameters or a subset of these parameters may be reported in the location stream based on the specific implementation.

TABLE 2

| | |
|---|---|
| LBSSequenceID | Continuously incrementing number for each session that is used to bind together multiple concurrently generated messages. |
| IMSI | IMSI of the subscriber generating the LBS data stream. |
| SessionID | Internal identifier used by the local RAN to identify a subscriber while in a connected state. |
| CellID | Identifier associated with the cell. Each cell in the local RAN shall have a unique identifier. |
| CellIsServing | Boolean that indicates whether the given cell is the best cell (as inferred by the local RAN) for data plane transmissions to the subscriber. |
| CellLatitude | Latitude, in degrees, of the cell. |
| CellLongitude | Longitude, in degrees, of the cell. |
| CellAltitude | Altitude, in meters, of the cell. |
| UEToCellFrameOff | UE time of arrival data. |
| UEToCellChipTm | UE time of arrival data. |
| CellCPICHRSCP | Received power of the pilot channel of the given cell as measured and reported by the UE. |
| CellPathLoss | Path loss between the UE and the given cell as measured and reported by the UE. |
| CellCPICHEcIo | Ratio of pilot channel energy of the given cell to the total wideband energy as measured and reported by the UE. |

The location update for a UE is identified by the IMSI of the UE, and the location update may additionally contain other identifiers such as the correspondent IP address, MSISDN, TMSI, etc if applicable, of the UE.

Additionally, the UE time of arrival (ToA) data is that specified in the 3GPP Specification TS 25.215 (available at the 3GPP website). While ToA is particularly attractive for position estimation in macrocell systems, it should be noted that the reference time on the UE can drift relative to the system clock. This drift is restricted by the 3GPP Specification TS 25.133 as follows: the maximum adjustment rate is ¼ chip per 200 ms; within any given 800*d ms period, the UE transmit timing will not change in excess of ±d chip from the timing at the beginning of this 800*d ms period, where $0 \leq d \leq ¼$. It should be further notes that UMTS is not a synchronized system, and the timing of each cell in the local RAN can drift relative to the absolute time by as much as 0.05 ppm. Moreover, the Chip™ is restricted by the granularity of UE reporting as specified in the 3GPP Specifications. Since UMTS has a chip rate of 3.84e6 chips/sec, a difference of 1 chip corresponds to a propagation delay of 80 meters. On the other hand, the local RAN has been designed as a small cell system and the maximum cell radius for a deployment should typically be less than 50 meters.

In accordance with various embodiments, a local RAN may enable periodic measurement reporting for a UE that requires a location stream associated with it. Additionally, the periodic measurement reporting may be enabled for a UE immediately upon entry of that UE into a Cell_DCH state, and while a circuit switched (CS) or a packet switched (PS) radio access bearer (RAB) is established. That is, when a UE enters into a Cell_DCH state, a dedicated physical channel (i.e., dedicated transport channel (DCH) is allocated to the UE in the uplink and downlink, and the UE becomes known to on the cell level according to its current active set. In this state, dedicated transport channels, downlink and uplink (TDD) shared transport channels, and/or a combination thereof may be used by the UE. Alternatively, and in accordance with other embodiments, the periodic measurement reporting may be enabled while the UE is in a Cell_DCH state, but before a CS or PS RAB is established.

A location stream may be provided by the local RAN in response to a location stream request. In the case of the UMTS embodiment, this may be while the UE is in a Cell_DCH connected state or while the UE is in any RRC Connected state. In the case of the UE being in a Cell_DCH connected state, a location update may be generated for all local RAN cells in all periodic measurement reports, or a location update may be generated for all the local RAN cells in an event triggered measurement report. It should be noted, however, that a location update may not generated for any cells in the measurement report (whether periodic or event triggered) that are not a part of the local RAN.

In the case of the UE being in the Cell_FACH and Cell_PCH states, there is no dedicated physical channel allocated to the UE. The Cell_FACH state is characterized by the UE monitoring a forward access channel (FACH) in the downlink. The UE is assigned a default common or shared transport channel in the uplink (e.g., a random access channel (RACE)). The position of the UE is known on a cell level according to the cell where the UE last made a cell update. The Cell_PCH state refers to a state where the UE selects a cell paging channel (PCH) and monitors that selected PCH. In this instance, the position of the UE is known, again, on a cell level according to the cell where the UE last made a cell update in the Cell_FACH state. A UE in these states does not provide all the information that may be gleaned from a measurement report, and because a syslog message is not variably sized, an empty string (i.e., " ") is used for all attributes that are unknown.

The UE's RRC state is typically determined by the UE or the RNC based on the data plane traffic requirements for the UE. However, if the UE is not in Cell_DCH, the quality of location stream is degraded. It may be possible for the local RAN to have mechanism, such as based on an inbound query from the location engine, to page or otherwise, migrate the UE's state from Idle, Cell_FACH, Cell_PCH or URA_PCH to Cell_DCH for a deterministic amount of this.

When the UE is in a Cell_DCH state, for each cell in the location update, the Ec/Io (ratio of received energy and interference level) and received signal code power (RSCP) values for the cell may be filtered using a single tap infinite impulse response (IIR) filter with a coefficient alpha. When a new cell is reported, the first set of values are used to initialize the filter, and there will be a separate globally applicable coefficient for each of the Ec/Io and RSCP values. The default value can be "1" which implies no filtering. The configurable range of the coefficient shall be [0.5:0.01:1], and filtering shall be in the log domain. A separate filtered value shall be maintained per cell for each of the Ec/Io and RSCP values. If a cell included in a previous location update is not present in the current measurement report, then the filters for that cell are reset. When the UE exits the Cell_DCH state, all filters will be reset.

To perform the filtering, a basic ARMA-1 filter can be utilized. This basic ARMA-1 filter may be defined as $y\_\{N\} = (1-\text{alpha})*y\_\{N-1\} + \text{alpha}*x\_\{N\}$, where $y\_\{N\}$ is the output of filter, and $x\_\{N\}$ is the currently received value. If alpha=1, filtering is skipped. It should be noted that only one filter need be applied per user, per cell, per parameter, the two parameters being the Ec/Io and RSCP. If $y\_\{N-1\}$ is undefined, then $y\_\{N-1\}=x\_\{N\}$.

Further regarding the filtering, filtering is only active when the UE is in a cell_DCH state, and periodic reports are being received from the UE. If filtering is active, the event reports can also go through the filter. Filtering can be either in the log domain or linear domain.

It should be noted that when a UE is in the Cell_DCH state, a location report may be not be generated if all of the filtered values for the Ec/Io and RSCP values of all the cells in the location report differ from the previous location report by less than a configurable threshold. There will be a separate globally applicable threshold configured for each of the Ec/Io and RSCP values. The default value shall be "0" which implies no thresholding. If there is no previously stored value, the first set of filtered values shall be both stored and transmitted.

Thresholding is a mechanism utilized in accordance with various embodiments to avoid unnecessary chatter from UEs that are presumed to have not physically moved since the last location report. This is done by comparing per user, per cell, per parameter, the following constraint: modulo(current filtered value−previously reported filtered value)>=threshold. It should be noted that a location report will be generated for a UE only if at least one comparison yields a false result. Additionally, if the number of cells reported is more or less than the previous location report, a new location report will be generated regardless of the compared values. It should be further noted that in anticipation of scenarios where the UE exhibits a higher variance in the reporting of a weak cell, certain embodiments may be implemented such that only cells with an RSCP/EcIo greater than some absolute minimum are considered for reporting.

Path loss information for each cell in a location report may be estimated using the filtered values for RSCP and the CPICH Ec/Ior and the MaxTxpower of the cell. Additionally, the location stream supports a global configuration for a maximum rate of location updates for the UE when in the Cell_DCH state. The configurable values may be determined by the available values in the 3GPP TS 25.331 Specification (available on the 3GPP website) on the periodicity of the measurement report message, or may be applied as a restriction on top of the periodicity of the measurement report message. The minimum reporting rate may be 1 second.

A location stream may be required even for sessions where no RABs are established. In particular, and for example, this can apply to scenarios where UEs register through a local RAN for the first time. In such scenarios, two options are provided in accordance with various embodiments. In accordance with a first option, the information in a radio resource control (RRC) connection request message is cached and used to generate a location update once the identity of the user is determined. In accordance with a second option, periodic measurement reporting is triggered for the predetermined UEs even for registration sessions. A minimum number of measurement reports could be required from the UE before the session can be disconnected.

As alluded to previously, ToA data can be included in the location stream. However, in small cell systems with, e.g., an approximate twenty meter cell radius, serving cell and path loss may be able to provide for more accurate positioning than the use of only ToA information. The location engine is able to deliver better UE position estimates when the UE reports three or more cells. Furthermore, RN location in an indoor facility, for example, optimized for coverage and throughput may not equate to optimal location for triangulation purposes. Additionally, considerations such as the following should also be considered: a high density of co-channel RNs providing/not providing spatial diversity (i.e., limits on UE sensitivity implies that the addition of a proximal RN may cause loss of measurement from a distal RN); a higher density of RNs may increase soft handover rates resulting in call instability; and a higher density of RNs may increase interference resulting in poorer user throughput and sector capacity.

Therefore, and in accordance with yet another embodiment, more diversity in the RN measurement data balanced with the optimization of the network for capacity and coverage is provided. Because UMTS systems have a frequency reuse of one, any additional RNs that are configured in-band will interfere with the system and affect overall performance. However, this is not the case if the added RNs are on another frequency. In this case, the UE can still provide measurement data on the RNs. Since UMTS supports both interfrequency (another frequency) UMTS cell searching as well as inter-RAT (a different radio technology) cell searching, such measurements can be supported natively just like intrafrequency measurements. These ideas would apply to other radio access technologies such as, but not limited to, LTE and WiMax, In UMTS, in order to perform the measurements, the UEs are put into compressed mode, which refers to a mode in which the transmitter (base band) on, e.g., the UE, creates gaps in its transmission in downlink and/or uplink in order for the UE receiver to tune its receive frequency to the non-used, desired frequency and perform measurements.

To achieve greater RN measurement data diversity, additional referred to as beacons, may be installed per the requirements for positioning accuracy. These beacons may be installed either interfrequency or interRAT, and have locations, transmit powers, transmit frequencies and cell identifiers that are known to the SN. A UE may not be put into compressed mode by the SN as a default, but rather as described earlier, based on a request to provide a high resolution location stream. Upon receipt of a location stream request, the SN may configure the specific UE into compressed mode and initiate the measurement of the beacons by the UE.

The reporting of the beacons' power is only used for the location stream. Thus, in accordance with one embodiment, a UE would never handout to the beacon cells. However, in accordance with other embodiments, the beacons could form separate neighbor topologies (either interfrequency or interRAT), where in one topology the UE would not handout, but in the other topology, handout could be effectuated. As such, the UE is capable of toggling between the separate neighbor topologies based on channel reports of the UE and a request from an external entity. After a predetermined amount of time, the SN will revert the UEs out of compressed mode and terminate (or throttle) the location stream.

As an added level of granularity, the location stream request could make a request for precision, and only if high precision was required would the UEs be put into compressed mode and report the beacons. For situations requiring less precision, the UEs may only report the intrafrequency cells as discussed above (either via periodic updates or event-triggered based on serving cell changes). That is, a low resolution location estimates/location stream could constantly be provided, but if a higher resolution/more accurate location estimate was requested, instead of utilizing the constant low resolution location estimate/location stream, a per-request based location estimate/location stream could be provided. For example, low resolution location estimates could be provided via measurements of the RNs, whereas high resolution location estimates could be determined using in addition to just the RNs, the measurements of the beacons as well. If a UE reports degraded co-channel signal quality, any compressed mode monitoring of the beacons could be disabled and then monitoring of live UMTS or GSM macro cells could be initiated for handout purposes. This feature should not have any impact on call stability for UEs that are not required to provide a location stream.

Further still, the additional beacon nodes do not need to support any user plane traffic, as again, they are merely installed to provide more diverse measurement reports. Consequently certain considerations may be taken in their design and operation. For example, the beacon radios would be very low interference as they would only transmit a pilot and cell identifier, and there are no dedicated or shared channels on these radios (rather only, e.g., common and/or broadcast channels). In UMTS, for example, these cells would radiate approximately only 5% of the total power radiated by a "real" cell. Additionally, new hardware is likely to be inexpensive as the beacon does not need to perform any processing. Again, because these radios are only used as beacons, they need not have any uplink receive capabilities which further simplifies their design. As a further optimization still, and because the pilot and cell identifier are a semi-static configuration, these waveforms could be generated a priori, or in a centralized location and stored on the radio thereby eliminating all base band radio processing.

Because many service operators have contiguous bandwidth that is subdivided into multiple channels, these beacons could radiate "mid channel." The advantage of radiating mid channel is that they would only be measureable by UEs that are explicitly instructed to measure these cells as a part of location reporting, and would only appear as background noise to all other UEs that are on the service operator's network on either of the channels. Further still, and from a configuration perspective, these nodes could also have static configurations for power and utilize a simple mechanism for configuring their identifiers, or may be connected to the SN and managed by the SN. Alternatively still, if the beacons are not operationally controlled by the SN, they may have a simple wideband power receiver that monitors the UE uplink frequency to detect for the presence of a UE. Since the only scenario where the beacons are useful is when a UE is in close proximity to the beacon, if no UE power is detected in the monitored uplink frequency, the beacons can shut down. This permits an indirect association with the SN because if the SN were to fail or be powered down, there would be no UEs on the frequency associated with the SN.

Further still, external cells could be relied upon for measurements in accordance with yet another embodiment. That is, the UE could be configured to perform measurements and report on such measurements based on the external cells of a macrocellular network with which the local RAN operates in conjunction with. Accordingly, the transmit powers and locations of the external cells would need to be known by the local RAN, or determined, e.g., either by sniffing or configuration.

Figure 3:
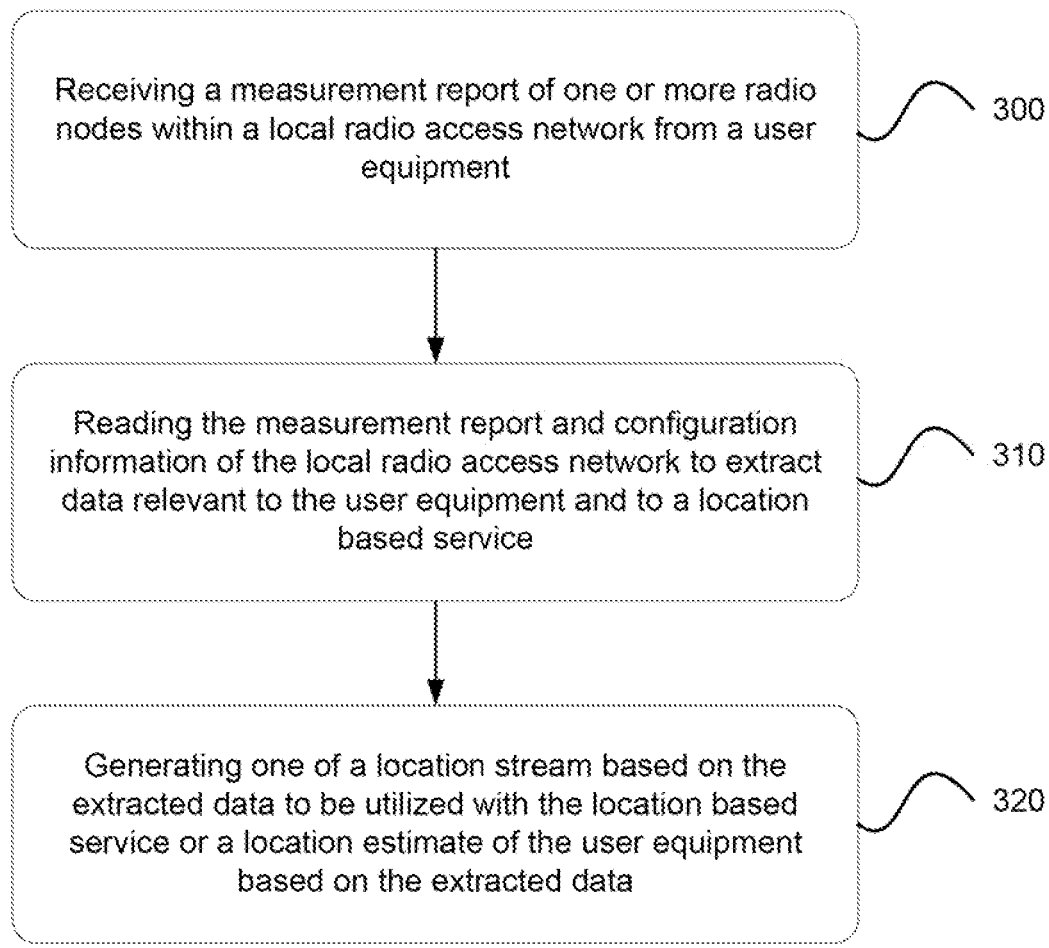
FIG. 3 is a flow chart illustrating a process in accordance with an embodiment of the invention.
Figure 4:
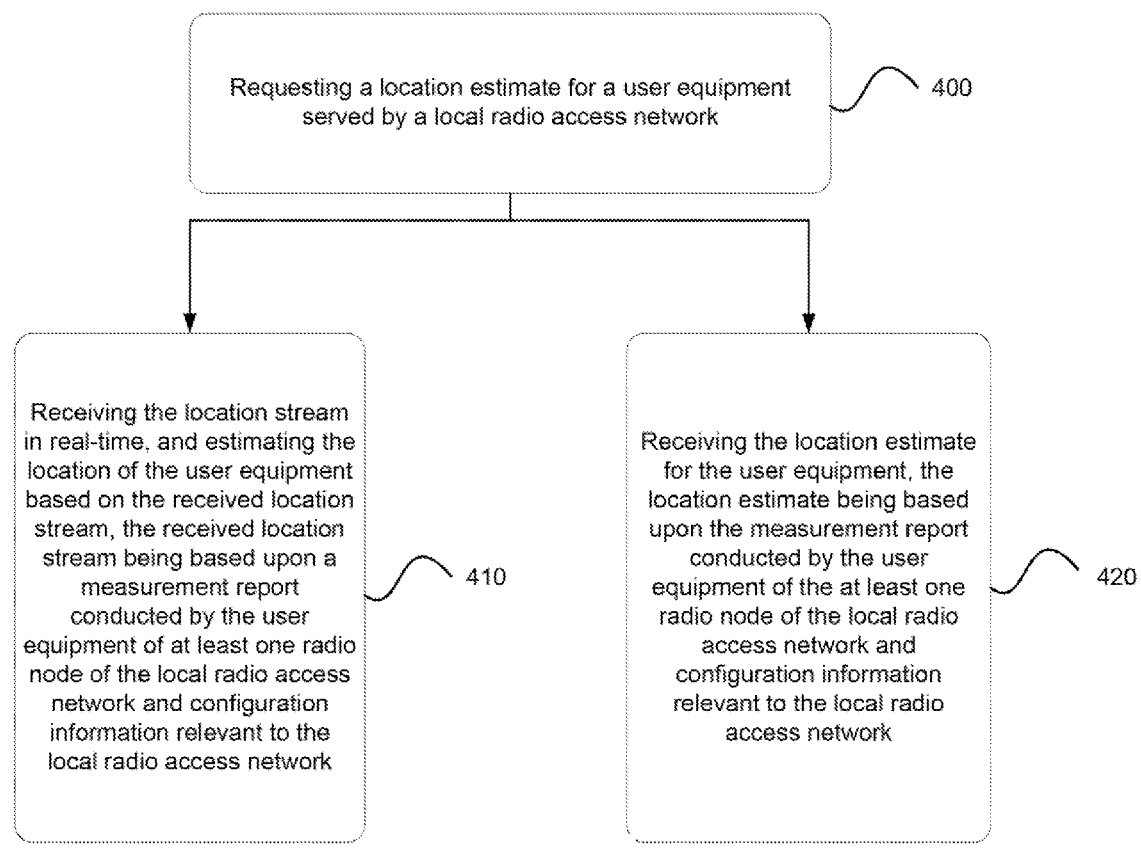
FIG. 4 is a flow chart illustrating a process in accordance with an embodiment of the invention.

FIG. 3 is a flow chart illustrating various processes performed in accordance with an embodiment of the present application. At 300, a measurement report of one or more radio nodes within a local radio access network from a user equipment is received. In accordance with various embodiments, the measurement report may include various parameters as described above and may be received periodically and/or in response to a triggering event. At 310, the measurement report is read, as well as configuration information of the local radio access network to extract data relevant to the user equipment and to a location based service. At 320, one of a location stream is generated based on the extracted data to be utilized with the location based service or a location estimate of the user equipment is generated based on the extracted data. As noted above, the location stream may include one or more location reports and/or location updates. The flow chart of FIG. 3 may be considered as being indicative of a local RAN perspective FIG. 4 illustrates various processes performed in accordance with an embodiment of the present application from a perspective of a location engine. At 400, a location estimate for a user equipment served by a local radio access network is requested. At 410, the requested location stream is received in substantially real-time, and the location of the user equipment is estimated based on the received location stream, the received location stream being based upon a measurement report conducted by the user equipment of at least one radio node of the local radio access network and configuration information relevant to the local radio access network. Alternatively, at 420, the location estimate is received "directly," the location estimate being based upon the measurement report conducted by the user equipment of the at least one radio node of the local radio access network and the configuration information relevant to the local radio access network.

At 420, the location of the user equipment is estimated based on the received location stream, where the received location stream is in turn, based upon a measurement report conducted by the user equipment of at least one radio node of the local radio access network and configuration information relevant to the local radio access network.

While various embodiments of the present invention have been described above for a WCDMA UMTS system, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A method, comprising:
  receiving information reported by a user equipment of one or more radio nodes within a local radio access network;
  reading the information reported by the user equipment and configuration information of the local radio access network to extract data relevant to the user equipment and to a location based service; and
  generating one of a location stream based on the extracted data to be utilized with the location based service or a location estimate of the user equipment based on the extracted data;
  wherein the one or more radio nodes comprises at least a serving radio node; and wherein the one or more radio nodes further comprise a plurality of beacon radio nodes that form at least two separate neighbor topologies;

a first of the at least two separate neighbor topologies in which the user equipment sends the information reported by the user equipment including measurements regarding the plurality of beacon radio nodes without attempting to handout to one of the plurality of beacon radio nodes; and a second of the at least two separate neighbor topologies in which the user equipment is allowed to handout to one of the plurality of beacon radio nodes; and wherein the user equipment is capable of toggling between the at least two separate neighbor topologies based on channel reports of the user equipment and a request from an external entity.

2. The method of claim 1, wherein the information reported by the user equipment is a measurement report.

3. The method of claim 1, wherein the reading of the information reported by the user equipment and the configuration information of the local radio access network to extract the data relevant to the user equipment and to the location based service occurs in response to one of a request for the location stream or paging of the user equipment.

4. The method of claim 1, wherein the receipt of the information reported by the user equipment is initiated based on a request for the location stream from a location engine.

5. The method of claim 4, wherein the request includes at least one parameter for configuring periodicity of the information reported by the user equipment, resolution of one of the location stream or the location estimate, location update rate associated with the user equipment, and duration of obtaining measurements for inclusion into the information reported by the user equipment.

6. The method of claim 1, wherein the generation of the location stream is continuously performed while the user equipment is connected to the location radio access network.

7. The method of claim 6, wherein the continuous generation of the location stream is associated with a low resolution location estimate of the user equipment.

8. The method of claim 7, further comprising: altering the continuous generation of the location stream to a per-request based generation of the location stream in response to a request for a high resolution location estimate of the user equipment.

9. The method of claim 1, wherein the one or more radio nodes further comprises a plurality of beacon radio nodes, each of the beacon radio nodes being configured as reduced functionality radio nodes radiating only common control and broadcast channel signals.

10. The method of claim 9, wherein each of the plurality of beacon radio nodes comprises a simple wideband power receiver configured to monitor an uplink frequency of the user equipment to detect for presence of the user equipment, and wherein if no power is detected in the monitored uplink frequency, the plurality of beacon radio nodes are shut down.

11. The method of claim 9, wherein characteristics of each of the plurality of beacon radio nodes including location, transmit power, transmit frequency, and cell identifier are known to a serving node of the local radio access network.

12. The method of claim 9, further comprising: configuring the user equipment into a compressed mode and initiating measuring of the beacon radio nodes by the user equipment to obtain beacon radio node measurement data to be included in the information reported by the user equipment.

13. The method of claim 1, wherein the location stream comprises at least one location report and at least one location update.

14. The method of claim 13, wherein the at least one location update comprises a message containing positional information of the user equipment in relation to one cell of the local radio access network served by one of the one or more radio nodes.

15. The method of claim 14, wherein the at least one location report comprises one or more of the at least one location update containing positional information of the user equipment in relation to multiple cells of the local radio access network served by the one or more radio nodes.

16. The method of claim 1, wherein the information reported by the user equipment is received one of periodically or in response to a triggering event.

17. The method of claim 1, wherein the location stream is available when the user equipment is in one of a Cell_DCH state, a Cell-FACH state, a Cell_PCH or URA PCH state.

18. The method of claim 1, wherein the user equipment is identified by one of the user equipment's International Mobile Subscriber Identity (IMSI), an Internet Protocol (IP) address associated with the user equipment, or the user equipment's Mobile Subscriber Integrated Services Digital Network (MSISDN) number.

19. The method of claim 1, wherein the receipt of the measurement report includes measurements of external cells located in a macrocell with which the local radio access network operates in conjunction with, and wherein the location and the transmit power of the external cells are one of known to the local radio access network, determined autonomously by the local radio access network, or configured by an administrative user.

20. An apparatus, comprising:
a processor; and
a memory including computer program code, the memory and the computer program code configured to, with the processor, cause the apparatus to perform at least the following:
receiving information reported by a user equipment of one or more radio nodes within a local radio access network from a user equipment;
reading the information reported by the user equipment and configuration information of the local radio access network to extract data relevant to the user equipment and to a location based service; and
generating one of a location stream based on the extracted data to be utilized with the location based service or a location estimate of the user equipment based on the extracted data;
wherein the one or more radio nodes comprises at least a serving radio node; and
wherein the one or more radio nodes further comprise a plurality of beacon radio nodes that form at least two separate neighbor topologies;
a first of the at least two separate neighbor topologies in which the user equipment sends the information reported by the user equipment including measurements regarding the plurality of beacon radio nodes without attempting to handout to one of the plurality of beacon radio nodes; and
a second of the at least two separate neighbor topologies in which the user equipment is allowed to handout to one of the plurality of beacon radio nodes; and wherein the user equipment is capable of toggling between the at least two separate neighbor topologies based on channel reports of the user equipment and a request from an external entity.

21. The apparatus of claim 20, wherein the information reported by the user equipment is a measurement report.

22. The apparatus of claim 20, wherein the reading of the information reported by the user equipment and the configuration information of the local radio access network to extract the data relevant to the user equipment and to the location based service occurs in response to one of a request for the location stream or paging of the user equipment.

23. The apparatus of claim 20, wherein the receipt of the information reported by the user equipment is initiated based on a request for the location stream from a location engine.

24. The apparatus of claim 23, wherein the request includes at least one parameter for configuring periodicity of the information reported by the user equipment, resolution of one of the location stream or the location estimate, location update rate associated with the user equipment, and duration of obtaining measurements for inclusion into the information reported by the user equipment.

25. The apparatus of claim 20, wherein the generation of the location stream is continuously performed while the user equipment is connected to the location radio access network.

26. The apparatus of claim 25, wherein the continuous generation of the location stream is associated with a low resolution location estimate of the user equipment.

27. The apparatus of claim 26 further comprising, altering the continuous generation of the location stream to a per-request based generation of the location stream in response to a request for a high resolution location estimate of the user equipment.

28. The apparatus of claim 20, wherein the one or more radio nodes further comprises a plurality of beacon radio nodes, each of the beacon radio nodes being configured as reduced functionality radio nodes radiating only common control and broadcast channel signals.

29. The apparatus of claim 28, wherein each of the plurality of beacon radio nodes comprises a simple wideband power receiver configured to monitor an uplink frequency of the user equipment to detect for presence of the user equipment, and
wherein if no power is detected in the monitored uplink frequency, the plurality of beacon radio nodes are shut down.

30. The apparatus of claim 28, wherein characteristics of each of the plurality of beacon radio nodes including location, transmit power, transmit frequency, and cell identifier are known to a serving node of the local radio access network.

31. The apparatus of claim 28, wherein the memory and the computer program code configured to, with the processor, cause the apparatus to further perform configuring the user equipment into a compressed mode and initiating measuring of the beacon radio nodes by the user equipment to obtain beacon radio node measurement data to be included in the information reported by the user equipment.

32. The apparatus of claim 20, wherein the location stream comprises at least one location report and at least one location update.

33. The apparatus of claim 32, wherein the at least one location update comprises a message containing positional information of the user equipment in relation to one cell of the local radio access network served by one of the one or more radio nodes.

34. The apparatus of claim 33, wherein the at least one location report comprises one or more of the at least one location update containing positional information of the user equipment in relation to multiple cells of the local radio access network served by the one or more radio nodes.

35. The apparatus of claim 20, wherein the information reported by the user equipment is received one of periodically or in response to a triggering event.

36. The apparatus of claim 20, wherein the location stream is available when the user equipment is in one of a Cell_DCH state, a Cell-FACH state, a Cell_PCH or URA PCH state.

37. The apparatus of claim 20, wherein the user equipment is identified by one of the user equipment's International Mobile Subscriber Identity (IMSI), an Internet Protocol (IP) address associated with the user equipment, or the user equipment's Mobile Subscriber Integrated Services Digital Network (MSISDN) number.

38. The method of claim 20, wherein the receipt of the measurement report includes measurements of external cells located in a macrocell with which the local radio access network operates in conjunction with, and wherein the location and the transmit power of the external cells are one of known to the local radio access network, determined autonomously by the local radio access network, or configured by an administrative user.

39. The apparatus of claim 20, wherein the apparatus comprises a serving node of the local radio access network.

40. A computer program product, embodied on a non-transitory computer-readable medium, comprising:
computer code for receiving information reported by a user equipment of one or more radio nodes within a local radio access network;
computer code for reading the information reported by the user equipment and configuration information of the local radio access network to extract data relevant to the user equipment and to a location based service; and
computer code for generating one of a location stream based on the extracted data to be utilized with the location based service or a location estimate of the user equipment based on the extracted data;
wherein the one or more radio nodes comprises at least a serving radio nod; and
wherein the one or more radio nodes further comprise a plurality of beacon radio nodes that form at least two separate neighbor topologies,
a first of the at least two separate neighbor topologies in which the user equipment sends the information reported by the user equipment including measurements regarding the plurality of beacon radio nodes without attempting to handout to one of the plurality of beacon radio nodes, and
a second of the at least two separate neighbor topologies in which the user equipment is allowed to handout to one of the plurality of beacon radio nodes, and
wherein the user equipment is capable of toggling between the at least two separate neighbor topologies based on channel reports of the user equipment and a request from an external entity.

* * * * *